United States Patent
Kikuchi et al.

[11] Patent Number: 5,886,852
[45] Date of Patent: Mar. 23, 1999

[54] B/DISK DRIVE APPARATUS WITH THERMALLY COMPENSATED STACKED DISK SPACERS

[75] Inventors: Kiyoji Kikuchi; Toshio Fujimoto, both of Tokyo, Japan

[73] Assignee: Kabushiki Kaisha Toshiba, Kawasaki, Japan

[21] Appl. No.: 83,372

[22] Filed: Jun. 29, 1993

[30] Foreign Application Priority Data

Jun. 30, 1992 [JP] Japan .................................. 4-172370

[51] Int. Cl.[6] ............................. G11B 5/012; G11B 25/04
[52] U.S. Cl. ..................................... 360/98.08; 360/99.12
[58] Field of Search ............................. 360/98.08, 99.05, 360/98.07, 99.12, 98.01; 369/192, 270, 271, 282, 289, 290

[56] References Cited

U.S. PATENT DOCUMENTS

| | | | |
|---|---|---|---|
| 4,498,165 | 2/1985 | Wilkinson, Jr. | 369/270 |
| 4,814,652 | 3/1989 | Wright | 360/98.07 |
| 4,910,620 | 3/1990 | Olbrich | 360/98.08 |
| 4,945,432 | 7/1990 | Matsudaira et al. | 360/98.08 |
| 5,031,062 | 7/1991 | Wood et al. | 360/98.08 |
| 5,101,306 | 3/1992 | Johnson | 369/270 |

FOREIGN PATENT DOCUMENTS

| | | | |
|---|---|---|---|
| 61-210573 | 9/1986 | Japan . | |
| 2-105377 | 4/1990 | Japan | 360/98.08 |

*Primary Examiner*—David L. Ometz
*Attorney, Agent, or Firm*—Finnegan, Henderson, Farabow, Garrett & Dunner, L.L.P.

[57] ABSTRACT

A disk drive apparatus includes a spindle motor which has a rotatable hub. The hub has an annular flange. A magnetic disk is fitted on the hub and urged against the flange by a clamp with a predetermined fixing force. A buffer member is interposed between the magnetic disk and the engagement portion. The buffer member has a thermal expansion coefficient which is substantially a intermediate value between thermal expansion coefficients of the magnetic disk medium and the engagement portion. A difference between the thermal expansion coefficients of the magnetic disk and the engagement member is larger than $10 \times 10^{-6}$ [1/° C].

7 Claims, 3 Drawing Sheets

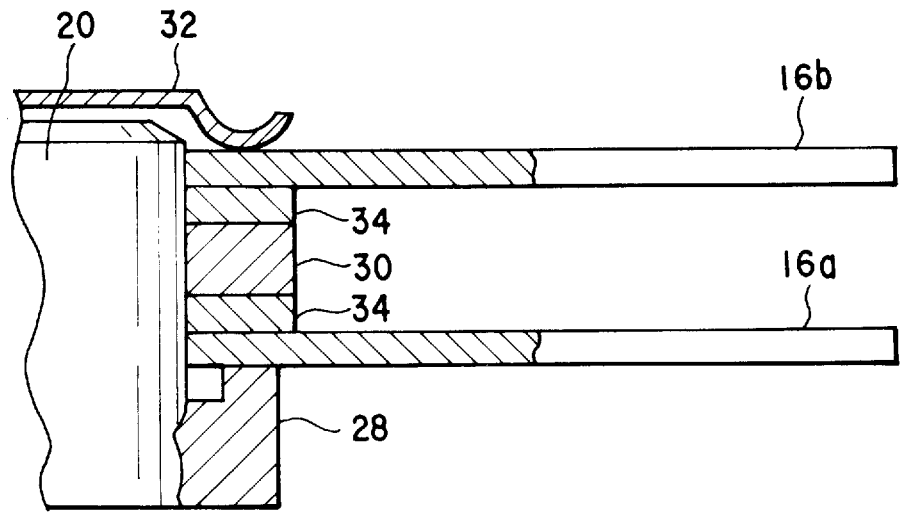
F I G. 6
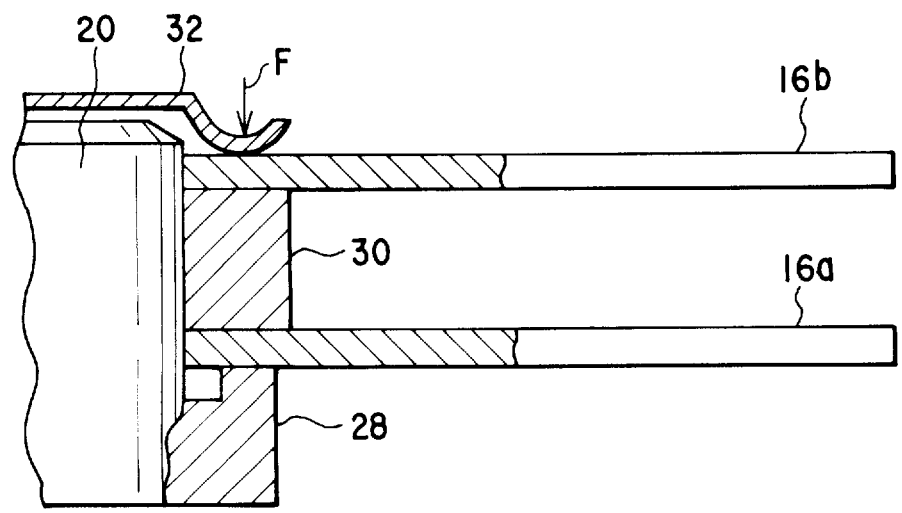
F I G. 7

B/DISK DRIVE APPARATUS WITH THERMALLY COMPENSATED STACKED DISK SPACERS

BACKGROUND OF THE INVENTION

1. Field of the Invention

The present invention relates to a disk drive apparatus comprising recording media to be rotated, such as magnetic disks or optical disks.

2. Description of the Related Art

In general, a magnetic disk drive apparatus (to be referred to as an HDD hereinafter) of 2.5 inches, for example, comprises a mechanical section, and a printed circuit board mounted with a control circuit for controlling the operation of a read/write circuit and the mechanical section. The mechanical section includes magnetic disks, a spindle motor, a disk clamp for fixing the magnetic disks to the spindle motor, magnetic heads, a carriage, a carriage drive motor (voice coil motor), and the like. The printed circuit board is electrically connected to the magnetic heads, spindle motor, and voice coil motor of the mechanical section.

Generally, the magnetic disks are fitted on the spindle motor as follows. Specifically, on the spindle motor is provided a cylindrical hub having a flange on one of its ends. The hub is rotated by the spindle motor. A plurality of magnetic disks and ring-shaped spacers are alternately stacked on the flange, and the disk clamp is fixed to the other end of the hub by a screw. The disk clamp has elasticity and therefore generates a biasing force for urging the magnetic disks and the spacers against the flange. By this force, the magnetic disks are fixed to and held by the hub of the spindle motor.

In a HDD having only one magnetic disk, a spacer may be arranged between the disk and the clamp or between the disk and the flange of the hub.

With the HDD having the above-mentioned arrangement, upon reading or writing data with respect to the disk, the disk is rotated by the spindle motor and the magnetic head is positioned over one of data tracks concentrically formed on the disk by the carriage. Then, the magnetic head reads data from or writes data on the data track. As a head positioning control system which determines the data read/write performance, there is known a servo-surface servo system (Dedicated Servo System) wherein one surface of a disk is recorded with servo data and used as a servo surface and a data-surface servo system (e.g. Sector Servo System) wherein servo data written on the data tracks on the data surface of a disk are available.

The servo-surface servo system requires a magnetic head for reading servo data and a magnetic head for reading/writing data and therefore has a problem of misalignment between these two magnetic heads resulting from the difference in thermal expansion between the heads with changes in temperature.

The data-surface servo system requires no servo magnetic head and hence does not cause the above problem. In addition, even if misalignment of the magnetic head with respect to the data tracks on the disk is caused by thermal expansion, this misalignment can be eliminated by performing position control for the magnetic head.

If a sudden vibration occurs in the magnetic disk, however, the tracking properties of the magnetic head with respect to the data track on the disk decrease, reducing the positional precision of the head with respect to the data track and varying the flying amount of the magnetic head from the disk. As a result, the data read/write operation becomes unstable to readily cause errors. Specifically, when a sudden vibration of the disk occurs during writing data on the disk by means of the magnetic head, data is written on an incorrect position on the disk. In this case, the incorrectly written data can not be read out by the head.

In many cases, a cause of the occurrence of such a sudden vibration in the disk is the differences in thermal expansion coefficients between a plurality of members used in the disk fixing section. Specifically, the disk fixing section includes, e.g., the magnetic disks themselves, the hub, the spacers, and the disk clamp, and, if the thermal expansion coefficients of these members differ from one another, the differences occur in the quantity of thermal expansion when an environmental temperature changes. The result is a strain occurring in each member. When the differences between the quantities of thermal deformation of the two adjacent members exceed the allowable thermal strain, relative displacement occurs between the two members so as to release the thermal strain in each member, and consequently the disks vibrate.

The above problem may be eliminated by using members having the same thermal expansion coefficient. As an example, U.S. Pat. No. 4,814,652 discloses a technique wherein a motor hub and disks are formed of materials having equal thermal expansion coefficients. In practice, however, in order for the individual members to achieve their respective predetermined functions, it is necessary to select materials meeting these functions, and this makes it difficult to select materials with thermal expansion coefficients equal to one another. In particular, it is extremely difficult to form all members that constitute the disk fixing section by using materials having the same thermal expansion coefficient.

SUMMARY OF THE INVENTION

The present invention has been made in consideration of the above situations and has as its object to provide a disk drive apparatus capable of performing stable data read and write operations by preventing vibrations in disks produced by changes in environmental temperature.

In order to achieve the above object, according to a disk drive apparatus of the present invention, when the difference d between thermal expansion coefficients of two adjacent members among a plurality of members constituting a disk fixing section of the apparatus is large, that is, the difference d is out of a range of $0 < d \leq$ about $10.0 \times 10^{-6}$ [1/° C.], a buffer member is arranged between the two adjacent members. The buffer member has a thermal expansion coefficient which is substantially an intermediate value between thermal expansion coefficients of the above two members located on two sides of the buffer member.

In addition, according to a disk drive apparatus of the present invention, a plurality of members constituting the disk fixing section are formed of materials having predetermined thermal expansion coefficients such that each of the difference d in thermal expansion coefficients between two adjacent members is in a range of $0 < d \leq$ about $10.0 \times 10^{-6}$ [1/° C.].

Also, according to the present invention, it is desirable that a fixing force F of the clamp for fixing the recording medium to the rotating member is set to satisfy the following relation:

$$0.01 \leq (m \cdot \alpha)/F \leq \mu,$$

where m is the mass of the recording medium, $\alpha$ is the acceleration acting on the recording medium, and $\mu$ is the minimum friction coefficient among frictional coefficients between two adjacent ones of the members constituting the disk fixing section.

According to the disk drive apparatus with the above arrangement, between two adjacent members having thermal expansion coefficients which are greatly different from each other is interposed a buffer member having a thermal expansion coefficient which is a substantially intermediate value between the thermal expansion coefficients of the two adjacent members, so that it is possible to decrease the difference in the quantity of thermal deformation between the buffer member and each of these two members with changes in temperature. This consequently eliminates the occurrence of relative displacement between a plurality of members caused by the thermal strains, preventing the occurrence of a sudden vibration in the recording medium.

Furthermore, according to the present invention, a plurality of members constituting the disk fixing section are formed of materials having predetermined thermal expansion coefficient such that the difference in thermal expansion coefficients between two adjacent members is in the range of $0 < d \leq$ about $10.0 \times 10^{-6}$ [1/°C.]. Therefore, this arrangement can also eliminate the occurrence of relative displacement between a plurality of members derived from thermal strains, preventing the occurrence of a sudden vibration in the recording medium.

Moreover, the fixing force of the clamp has a correlation with the release of the thermal strain produced in each of the members with a change in temperature. According to the present invention as described above, setting the fixing force F of the clamp to satisfy $0.01 \leq (m \cdot \alpha)/F < \mu$ enables the recording medium to rotate together with the hub of the spindle motor without producing any positional displacement relative to the hub. This also makes it possible to hold the recording medium with a substantially minimum force that can prevent positional displacement of the recording medium with respect to the hub, which is attributed to an external force. When the temperature changes, therefore, the relative thermal deformation between the members constituting the fixing section decreases, so that the thermal strain of each member of the disk fixing section can be reduced. Thus, a sudden vibration in the recording medium can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 3 illustrate an HDD according to an embodiment of the present invention, in which:

FIG. 1 is a perspective view of the HDD,

FIG. 2 is a sectional view taken along a line II—II in FIG. 1, and

FIG. 3 is a sectional view showing a magnetic disk fixing section;

FIG. 6 is a sectional view showing a magnetic disk fixing section of an HDD according to still another embodiment of the present invention; and FIG. 7 is a sectional view showing a magnetic disk fixing unit of an HDD according to still another embodiment of the present invention.

DETAILED DESCRIPTION OF THE PREFERRED EMBODIMENTS

Embodiments according to the present invention will be described in detail with reference to the accompanying drawings.

Figure 1:
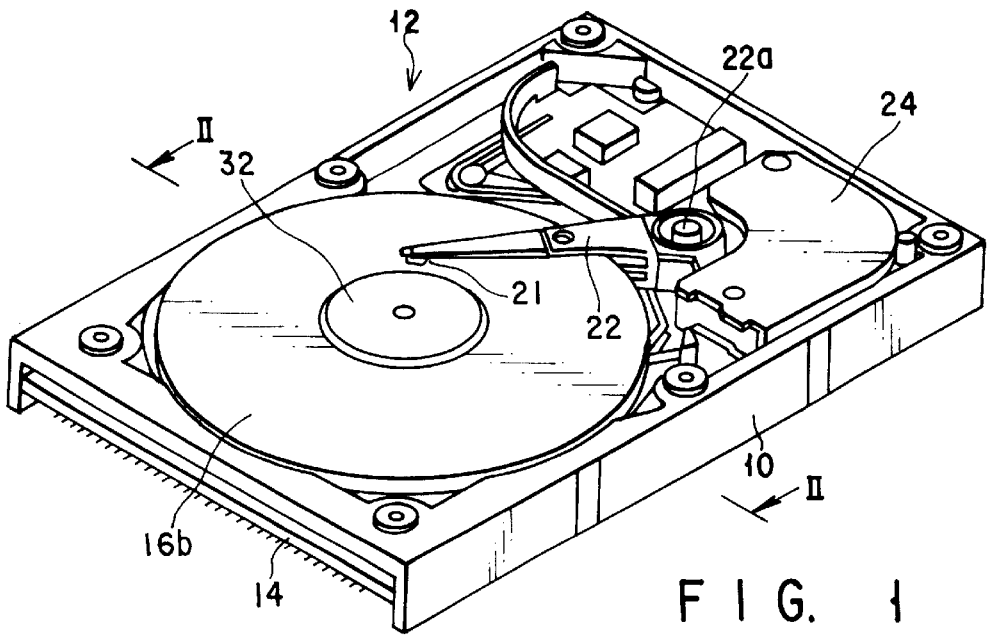
Figure 2:
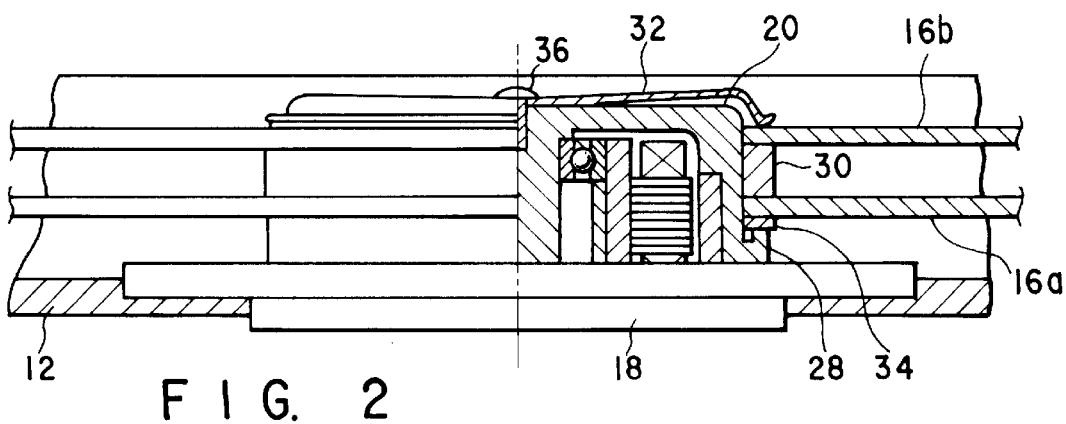

As shown in FIGS. 1 and 2, an HDD according to an embodiment of the present invention comprises a mechanical section 12 housed in a housing 10 and a printed circuit board 14 arranged outside the housing to oppose the bottom wall of the housing. An upper opening of the housing 10 is covered with a top cover (not shown) to seal the interior of the housing. The mechanical section 12 includes a plurality of, for example, two magnetic disks 16a and 16b as recording media, and a spindle motor 18 for rotating these disks. The magnetic disks 16a and 16b are mounted on a hub 20 of the spindle motor 18. The mechanical section 12 further includes a carriage 22 supporting a plurality of magnetic heads 21 (only one is shown in FIG. 1) and for seeking the magnetic heads with respect to the magnetic disks in their radial direction, and a voice coil motor 24 for rotating the carriage about a pivot shaft 22a. The printed circuit board 14 is mounted with a read/write circuit and a control circuit (not shown) and is connected to the magnetic head 21, the spindle motor 18, and the voice coil motor 24.

As shown in FIG. 2, the hub 20 as a rotating member of the spindle motor 18 is formed into a cylindrical shape and has an annular flange 28 as an engagement portion on the outer circumferential surface at its lower end portion. The magnetic disk 16a, a ring-shaped spacer 30, and the magnetic disk 16b are fitted around the hub 20 and stacked on the flange 28 in the order named. A cup-like disk clamp 32 is fixed to the upper end of the hub 20 by a screw 36. The peripheral portion of the clamp 32 having elasticity abuts against the upper surface of the disk 16b, thereby urging the disk 16b, the spacer 30, and the disk 16a against the flange 28 with a fixing force F. As a result, the two magnetic disks 16a and 16b are fixed to the hub 20 and rotated integral with the hub.

Figure 3:
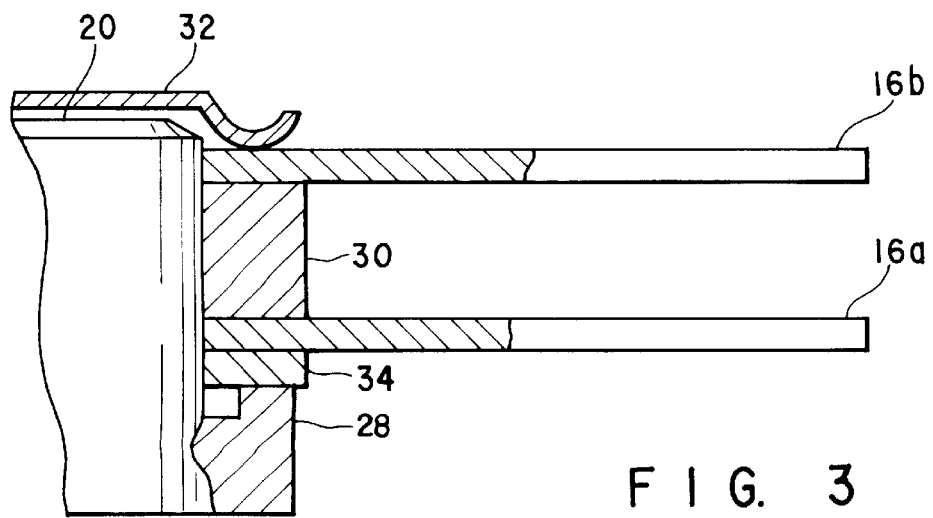

According to this embodiment, as shown in FIG. 3, an annular buffer member 34 having an inner hole through which the hub 20 is inserted is sandwiched between the flange 28 of the hub 20 and the magnetic disk 16a. This buffer member 34 so acts as to buffer a thermal stress occurring in the disk fixing section owing to the differences in thermal expansion coefficients between the individual members that constitute the disk fixing section, i.e., the flange 28, the magnetic disks 16a and 16b, the spacer 30, and the disk clamp 32. The buffer member 34 is disposed between two adjacent ones among the members constituting the disk fixing section, which have different thermal expansion coefficients, the difference d between these coefficients being large and out of the range of $0 < d \leq$ about $10.0 \times 10^{-6}$ [1/° C.], such as the flange 28 and the disk 16a. The buffer is formed of a material having a thermal expansion coefficient which is substantially an intermediate value between the thermal expansion coefficients of the flange and the disk.

In the embodiment shown FIG. 3, the magnetic disks 16a and 16b are formed of aluminum with a thermal expansion coefficient of 23.8×10$^{-6}$ [1/° C.], the spacer 30 is formed of aluminum with a thermal expansion coefficient of 23×10$^{-6}$ [1/° C.], the hub 20 including the flange 28 is formed of stainless steel with a thermal expansion coefficient of 9.9× 10$^{-6}$ [1/° C.], and the disk clamp 32 is formed of stainless steel with a thermal expansion coefficient of 17×10$^{-6}$ [1/° C.]. In this case, in the difference between the thermal expansion coefficients each two adjacent members, the difference between the thermal expansion coefficients of the flange 28 and the magnetic disk 16a is most large, i.e., 13.9×10$^{-6}$ [1/° C.] and is out of the range of the 0<d≦about 10.0×10$^{-6}$ [1/°C.]. Therefore, the buffer member 34 is-formed of a material, such as stainless steel, with a thermal expansion coefficient of about 17×10$^{-6}$ [1/° C.], and arranged between the flange 28 and the disk 16a.

Figure 4:
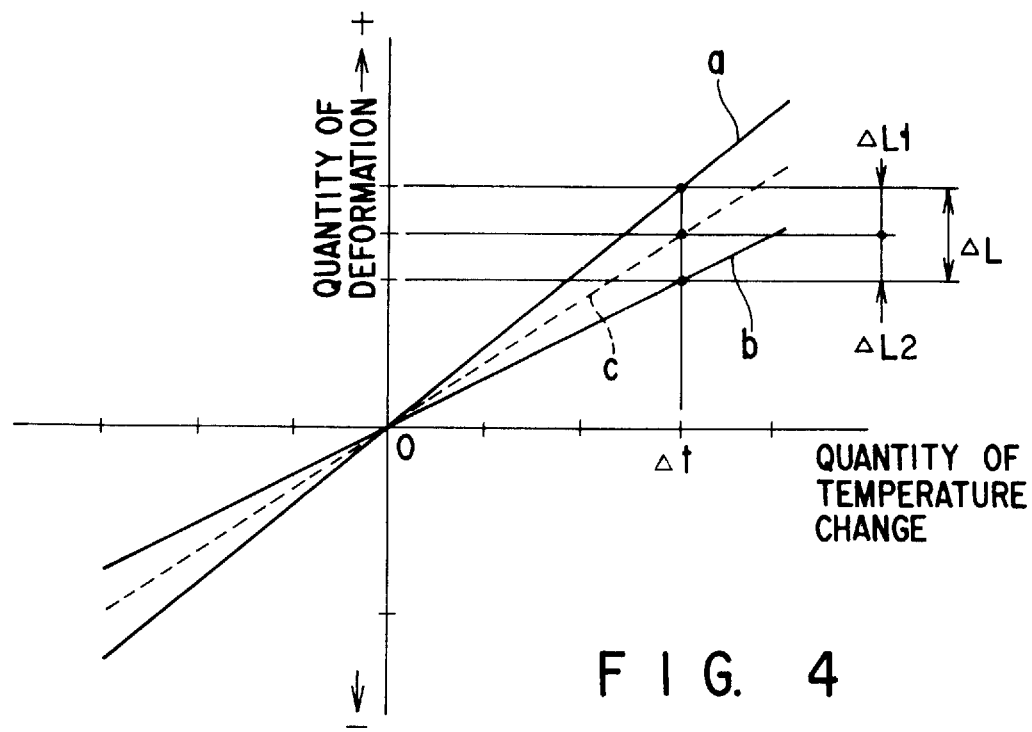
FIG. 4 is a graph showing the relationship between the quantity of temperature change and the quantity of thermal deformation.

Referring to FIG. 4, characteristic curves a, b, and c indicate the relationship between the quantity of temperature change and the quantity of thermal deformation of the disk 16a, the flange 28, and the buffer member 34, respectively. As shown in FIG. 4, when the absolute value of the quantity of temperature change reaches Δt, the difference in quantity of thermal deformation between the disk 16a and the flange 28 becomes an allowable thermal strain ΔL. In this embodiment, however, the buffer member 34 having a thermal expansion coefficient which is substantially an intermediate value between the thermal expansion coefficients of the disk 16a and the flange 28 is interposed between the disk and the flange. When the absolute value of the quantity of temperature change is Δt, therefore, each of a difference ΔL1 in quantity of thermal deformation between the disk 16a and the buffer member which are adjacent to each other and a difference ΔL2 in quantity of thermal deformation between the flange 28 and the buffer member which are also adjacent to each other are substantially half the allowable thermal strain ΔL. For this reason, even if a change in environmental temperature occurs, no relative displacement which releases the thermal strains between the disk 16a and the buffer member 34 and between the flange 28 and the buffer member 34 occurs between them, preventing the occurrence of a vibration in the disk 16a.

Figure 5:
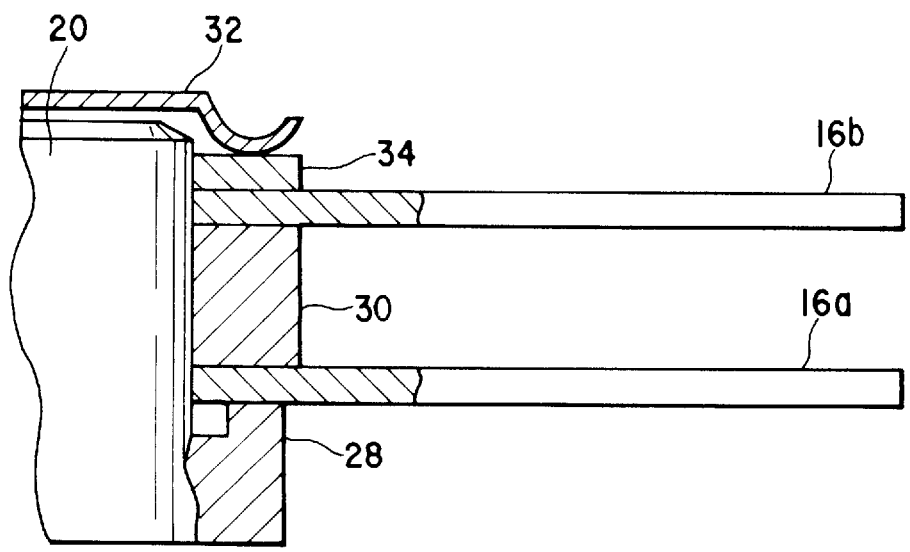
FIG. 5 is a sectional view showing a magnetic disk fixing section of an HDD according to another embodiment of the present invention.

In addition, as shown in FIG. 5, the buffer member 34 need not be arranged between the disk 16a and the flange 28 but may be arranged between the disk 16b and the clamp 32 when the flange 28 is formed of a material, such as stainless steel, with a thermal expansion coefficients of the 17×10$^{-6}$ [1/° C.], the clamp 32 is formed of a material, such as stainless steel, with a thermal expansion of 9.9×10$^{-6}$ [1/° C.], and another members are formed of the materials as in the arrangement shown in FIG. 3. The same effect as the above embodiment can also be obtained in this arrangement. When the flange 28 and disk clamp 32 are formed of a material, such as stainless steel, with a thermal expansion coefficient of 9.9×10$^{-6}$ [1/° C.] and another members are formed of the same materials as in the arrangement shown in FIG. 3, two buffer members 34 may be arranged between the disk 16a and the flange 28 and between the disk 16b and the clamp 32, respectively.

Furthermore, if the difference d in thermal expansion coefficients between the magnetic disks 16a and 16b and the spacer 30 is large and out of the range of 0<d≦about 10.0–10$^{-6}$ [1/° C.], as shown in FIG. 6, a buffer members 34 may be arranged between the spacer 30 and each of the magnetic disks 16a and 16b. For example, when the disks 16a and 16b are formed of glass with a thermal expansion coefficient of 9.0×10$^{-6}$ [1/° C.] and the spacer 30 is formed of aluminum with a thermal expansion coefficient of 23×10$^{-6}$ [1/° C.], a buffer member 34 made of stainless steel with a thermal expansion coefficient of 17×10$^{-6}$ [1/° C.] is arranged between each of the disks 16a and 16b and the spacer 30. With this arrangement, even if a thermal deformation occurs in each member owing to a change in environmental temperature, the difference in quantity of thermal deformation between the spacer 30 and the buffer member 34 becomes smaller than the allowable thermal strain, preventing the occurrence of relative displacement which releases the thermal strain between these members. As a consequence, the occurrence of vibrations in the disks 16a and 16b can be prevented. This can prevent data read/write errors derived from sudden vibrations in the magnetic disks, making stable read and write operations feasible.

According to the arrangements as described above, when the environmental temperature changes, the individual members, such as the disks, the flange, the spacer, and the disk clamp, deform in accordance with their respective thermal expansion coefficients. However, as described above, since the thermal expansion buffer member 34 having a thermal expansion coefficient which is nearly a central value between the thermal expansion coefficients of members having different thermal expansion coefficients is interposed between these members, the difference in quantity of thermal deformation between these members due to the change in temperature can be decreased. This can prevent vibrations in the magnetic disks caused by the relative displacement, making stable data read and write operations possible.

Note that the HDD having two magnetic disks has been described in the above embodiment, but the present invention is similarly applicable to an HDD having three or more magnetic disks or only one magnetic disk. When an HDD has only one magnetic disk, a buffer member with a desired thermal expansion coefficient is interposed between the disk and the flange or between the disk and the disk clamp, or in both the locations.

FIG. 7 shows a main part of an HDD according to another embodiment of the present invention.

In this HDD, magnetic disks 16a and 16b are formed of glass with a thermal expansion coefficient of about 9.0×10$^{-6}$ [1/° C.], a disk clamp 32, a spacer 30 and a hub 20 are formed of stainless steel with a thermal expansion coefficient of about 9.9×10$^{-6}$ [1/° C.]. Thus, the differences in thermal expansion coefficients between the disk 16b and the clamp 32, between the disk 16a and the flange 28, and between each of the disks 16a and 16b and the spacer 30 can be set to about 10×10$^{-6}$ [1/° C.] or less, respectively. This prevents the occurrence of relative displacement that releases a thermal strain of each member produced with a change in temperature, thereby preventing sudden vibrations in the disks.

In each of the embodiments shown in FIGS. 3, 5, 6, and 7, the occurrence of vibrations in magnetic disks derived from a thermal deformation of each member can be more effectively prevented by setting the fixing force F of the disk clamp 32 at a predetermined value.

Specifically, in an arrangement in which magnetic disks 16a and 16b and a spacer 30 are urged against a flange 28 of a hub 20 and held thereat with the fixing force F of the clamp 32, if the fixing force (clamp force) F is small, each member gradually expands with temperature rise, so no sudden relative displacement which releases a thermal strain of each member as described above occurs. If, however, the fixing force F is zero, the magnetic disks 16a and 16b cannot be held on the hub 20 of the spindle motor.

According to this embodiment, therefore, the fixing force F of the disk clamp 32 is set at a minimum value, by which the disks 16a and 16b can be rotated integral with the hub 20 without producing any positional displacement with respect to the hub, and which is required to prevent relative displacement between the disks and the hub caused by some external factor. In this case, the external factor means an external force, such as an external impact or vibration acting on the HDD, which produces relative displacement between the disks 16a and 16b and the hub 20.

More specifically, the fixing force F is so set as to satisfy the following relation:

$$F > m \cdot \alpha (1/\mu)$$

where m is the mass of the magnetic disk, $\alpha$ is the acceleration acting on the magnetic disk, and $\mu$ is the minimum friction coefficient among the frictional coefficients between two adjacent ones of the members constituting the disk fixing section.

To minimize the fixing force F, the fixing force F need only be set within a range of $0.01 \leq (m \cdot \alpha)/F < \mu$.

By setting the fixing force F of the disk clamp 32 at the minimum necessary value as described above, it is possible to effectively prevent the occurrence of sudden vibrations in the disks 16a and 16b derived from thermal strains, thereby performing stable data read and write operations.

The present invention is not limited to the above embodiments but can be modified without departing from the spirit and scope of the invention. For example, the present invention can be applied not only to an HDD but to other disk drive apparatuses, such as an optomagnetic disk drive apparatus, a floppy disk drive apparatus, an optical disk drive apparatus, and the like.

What is claimed is:

1. A disk drive apparatus comprising:

a rotating member having an engagement portion;

a disk-like recording medium;

a clamp for urging the recording medium against the engagement portion of the rotating member with a predetermined fixing force to fix the recording medium to the rotating member; and a metal buffer member provided in at least one of a position between the recording medium and the engagement portion and a position between the recording medium and the clamp, the buffer member having a thermal expansion coefficient which is substantially an intermediate value between thermal expansion coefficients of the two members located on two sides of the buffer member, wherein the difference between the thermal expansion coefficients of the two members located on the two sides of the buffer member is larger than about $10 \times 10^6$ (1/° C.).

2. An apparatus according to claim 1, wherein said rotating member has a substantially cylindrical hub, said engagement portion has an annular flange formed on an outer circumferential surface at one end of the hub, and each of said recording medium and said buffer member has an annular shape with an inner hole in which the hub is inserted.

3. An apparatus according to claim 1, wherein said predetermined fixing force F is set to satisfy the following relation:

$$0.01 \leq (m \cdot \alpha)/F < \mu$$

where m is the mass of the recording medium, $\alpha$ is the acceleration acting on the recording medium, and $\mu$ is the minimum friction coefficient among frictional coefficients between two adjacent ones of the engagement portion, the recording medium, the buffer member, and the clamp.

4. A disk drive apparatus comprising:

a rotating member having an engagement portion;

a plurality of disk-like recording media;

a spacer interposed between two adjacent recording media;

a clamp for urging the recording media and the spacer against the engagement portion of the rotating member with a predetermined fixing force and fixing the recording media and the spacer to the rotating member; and a metal buffer member provided in at least one of a position between the recording medium and the engagement portion, a position between the recording medium and the clamp, and a position between the spacer and the recording medium, the buffer member having a thermal expansion coefficient which is substantially an intermediate value between thermal expansion coefficients of the two members located on two sides of the buffer member, wherein the difference between the thermal expansion coefficients of the two members located on the two sides of the buffer member is larger than about $10 \times 10^{-6}$ (1/° C.).

5. An apparatus according to claim 4, wherein said predetermined fixing force F is set to satisfy the following relation:

$$0.01 \leq (m \cdot \alpha)/F < \mu$$

where m is the mass of the recording medium, $\alpha$ is the acceleration acting on the recording medium, and $\mu$ is the minimum friction coefficient among frictional coefficients between two adjacent ones of the engagement portion, the recording medium, the buffer member, the spacer, and the clamp.

6. A method of manufacturing a disk drive apparatus, the method comprising the steps of:

providing a rotating member having an engagement portion;

fitting a disk-like recording medium on the rotating member;

urging the recording medium against the engagement portion of the rotating member with a predetermined fixing force to fix the recording medium to the rotating member; and arranging a metal buffer member in at least one of a position between the recording medium and the engagement portion and a position between the recording medium and the clamp, the buffer member having a thermal expansion coefficient which is substantially an intermediate value between thermal expansion coefficients of the two members located on two sides of the buffer member, wherein the difference between the thermal expansion coefficients of the two members located on the two sides of the buffer member is larger than about $10 \times 10^{-6}$ (1/° C.).

7. A method of manufacturing a disk drive apparatus, the method comprising the steps of:

providing a rotating member having an engagement portion;

fitting a plurality of disk-like recording media on the rotating member;

interposing a spacer between two adjacent recording media;

urging the recording media and the spacer against the engagement portion of the rotating member with a predetermined fixing force to fix the recording medium to the rotating member; and arranging a metal buffer member in at least one of a position between the recording medium and the engagement portion, a position between the recording medium and the clamp, and a position between the spacer and the recording medium, the buffer member having a thermal expansion coefficient which is substantially an intermediate value between thermal expansion coefficients of the two members located on two sides of the buffer member, wherein the difference between the thermal expansion coefficients of the two members located on the two sides of the buffer member is larger than about $10 \times 10^{-6}$ (1/° C.).

* * * * *

UNITED STATES PATENT AND TRADEMARK OFFICE
CERTIFICATE OF CORRECTION

PATENT NO. : 5,886,852
DATED : March 23, 1999
INVENTOR(S) : Kiyoji Kikuchi et al.

It is certified that error appears in the above-identified patent and that said Letters Patent is hereby corrected as shown below:

On the title page, item [54] and Column 1;
    in the Title, line 1, "B/DISK" should read --DISK--.

Title Page, Item [57], in the Abstract, line 7, "a intermediate" should read --an intermediate--.

Claim 1, Col. 7, line 53, "10x10$^6$" should read --10x10$^{-6}$--.

Signed and Sealed this

Fourteenth Day of December, 1999

Attest:

Q. TODD DICKINSON

*Attesting Officer*  *Acting Commissioner of Patents and Trademarks*